(12) United States Patent
Lee et al.

(10) Patent No.: US 8,307,221 B2
(45) Date of Patent: Nov. 6, 2012

(54) MOBILE COMMUNICATION DEVICE AND CONTROLLING METHOD THEREOF

(75) Inventors: Yong-Der Lee, Taipei (TW); Li-Pin Yeh, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 423 days.

(21) Appl. No.: 12/562,256

(22) Filed: Sep. 18, 2009

(65) Prior Publication Data

US 2010/0077235 A1    Mar. 25, 2010

(30) Foreign Application Priority Data

Sep. 22, 2008    (TW) .............................. 97136299 A

(51) Int. Cl.
*G06F 1/00* (2006.01)
*G06F 1/26* (2006.01)
(52) U.S. Cl. ........................................ 713/300; 713/320
(58) Field of Classification Search .................. 713/310, 713/320, 324, 330, 340
See application file for complete search history.

(56) References Cited

U.S. PATENT DOCUMENTS

| | | | |
|---|---|---|---|
| 5,754,870 A | 5/1998 | Pollard et al. | |
| 6,289,464 B1 * | 9/2001 | Wecker et al. | 713/300 |
| 6,622,178 B1 | 9/2003 | Burke et al. | |
| 6,725,060 B1 | 4/2004 | Chhatriwala et al. | |
| 6,943,667 B1 * | 9/2005 | Kammer et al. | 340/286.01 |
| 7,376,850 B2 | 5/2008 | Lin et al. | |
| 7,415,626 B2 | 8/2008 | Lilja et al. | |
| 7,878,395 B2 * | 2/2011 | Adams et al. | 235/382 |
| 2003/0233587 A1 * | 12/2003 | Sanu | 713/300 |
| 2004/0003307 A1 * | 1/2004 | Tsuji | 713/310 |
| 2006/0075269 A1 * | 4/2006 | Liong et al. | 713/300 |
| 2006/0075271 A1 * | 4/2006 | Lilja et al. | 713/322 |
| 2006/0112287 A1 * | 5/2006 | Paljug | 713/300 |
| 2006/0112292 A1 * | 5/2006 | Lin et al. | 713/320 |
| 2007/0023499 A1 * | 2/2007 | Wurzburg et al. | 235/376 |
| 2007/0055795 A1 * | 3/2007 | Seo et al. | 710/15 |
| 2008/0079482 A1 * | 4/2008 | Hober et al. | 327/544 |
| 2008/0229132 A1 * | 9/2008 | Suga et al. | 713/324 |

FOREIGN PATENT DOCUMENTS

| | | |
|---|---|---|
| CN | 1869879 | 11/2006 |
| TW | 200407006 | 5/2004 |

* cited by examiner

*Primary Examiner* — Thomas Lee
*Assistant Examiner* — Phil Nguyen
(74) *Attorney, Agent, or Firm* — Jianq Chyun IP Office

(57) ABSTRACT

A mobile communication device includes a control circuit unit, a first interface, a status change detecting circuit, and an embedded controller. The control circuit unit is operated in either a normal working mode or a power-saving mode. The first interface is connected with the data card and the control circuit unit. The status change detecting circuit is connected with the first interface. The embedded controller is connected with the status change detecting circuit and the control circuit unit. If the control circuit unit is operated in the power-saving mode and the data card is switched from a standby status to a working status, the data card generates a status-changing signal to the status change detecting circuit. In response to the status-changing signal, the control circuit unit is controlled to be switched from the power-saving mode to the normal working mode by the embedded controller.

14 Claims, 2 Drawing Sheets

MOBILE COMMUNICATION DEVICE AND CONTROLLING METHOD THEREOF

FIELD OF THE INVENTION

The present invention relates to an electronic device, and more particularly to a mobile communication device. The present invention also relates to a method for controlling the mobile communication device.

BACKGROUND OF THE INVENTION

With increasing development of communication technologies, a 3G data card could be externally connected to a mobile electronic device such as a notebook computer, a personal digital assistant (PDA) or a media information device (MID). Therefore, such a mobile electronic device is also referred as a 3G mobile communication device.

For example, when a 3G data card is connected to a notebook computer, the notebook computer will possess the functions of wireless network connection and wireless communication. In other words, wherever and whenever the user is, the notebook computer could be connected to the Internet or used as a communicating device as long as the notebook computer is in communication with a base station of a mobile network system.

FIG. 1 is a schematic functional block diagram illustrating a notebook computer that is connected to a 3G data card according to the prior art. As shown in FIG. 1, the notebook computer 100 comprises a control circuit unit 120. The control circuit unit 120 comprises a central processing unit (CPU) 102, a north bridge chip 104 and a south bridge chip 106. The notebook computer 100 further comprises a peripheral component interconnect mini card (or PCI-Express mini card) interface. Via a USB interface of the PCI-Express mini card interface, the 3G data card 150 and the control circuit unit 120 communicate with each other to exchange data in order to implement the functions of wireless network connection and wireless communication.

For example, for making phone calls over the internet by the notebook computer 100, the notebook computer 100 needs to be in communication with a base station of a mobile network system through the connection between the control circuit unit 120 and the 3G data card 150.

Similarly, the personal digital assistant (PDA) includes a control circuit unit, for example an ARM9 processor or an ARM11 processor. Via the USB interface, the ARM9 processor and a 3G data card communicate with each other to exchange data, so that the PDA possesses the wireless network connection and wireless communication. Similarly, the media information device (MID) also has a control circuit unit to be connected with a 3G data card.

Please refer to FIG. 1 again. As known, the notebook computer 100 has several power-saving modes (e.g. S3 or S5 power-saving mode). S0 is the normal working mode of the notebook computer 100. According to the time needed to bring the notebook computer 100 back to the normal working mode S0, the notebook computer 100 enters different power-saving modes. For example, the notebook computer 100 is switched from the normal working mode S0 to the power-saving mode S3 if the notebook computer 100 has not been used for a relative longer time. Whereas, the notebook computer 100 is switched from the normal working mode S0 to the power-saving mode S5 if the notebook computer 100 has not been used for a relative shorter time.

In a case that the user intends to communicate with the base station through the 3G data card 150 when the notebook computer 100 is in a power-saving mode, the user could easily operate the notebook computer 100 to have the notebook computer 100 enter the normal working mode S0. As such, the user could make phone calls or link to the Internet by using the notebook computer 100.

On the other hand, in a case that an external phone call is being received by the 3G data card 150 when the notebook computer 100 is at a power-saving mode, the 3G data card 150 has no mechanism to wake up the notebook computer 100. Under this circumstance, the external phone call fails to be received by the notebook computer 100. In other words, for effectively receiving the external phone call, the notebook computer 100 that is connected to the 3G data card 150 should be continuously maintained at the normal working mode S0.

Since the notebook computer 100 that is connected to the 3G data card 150 fails to enter the power-saving mode, the power consumption of the notebook computer 100 is considerable and the built-in battery fails to provide electricity for a long time. Similarly, the above drawbacks occur when the personal digital assistant (PDA) or the media information device (MID) is connected to a 3G data card.

SUMMARY OF THE INVENTION

In an embodiment, the present invention provides a mobile communication device that is connected with a 3G data card. The mobile communication device includes a control circuit unit, a first interface, a status change detecting circuit, and an embedded controller. The control circuit unit is operated in either a normal working mode or a power-saving mode. The first interface is connected with the data card and the control circuit unit. The status change detecting circuit is connected with the first interface. The embedded controller is connected with the status change detecting circuit and the control circuit unit. If the control circuit unit is operated in the power-saving mode and the data card is switched from a standby status to a working status, the data card generates a status-changing signal to the status change detecting circuit. In response to the status-changing signal, the control circuit unit is controlled to be switched from the power-saving mode to the normal working mode by the embedded controller.

In another embodiment, the present invention provides a method for controlling a mobile communication device. The mobile communication device is connected with a data card through a first interface. The method includes the following steps. If the mobile communication device is operated in a power-saving mode, a first signal and a second signal provided by the first interface are detected. If the first signal and the second signal are unchanged and complementary, the mobile communication device is maintained in the power-saving mode. If the first signal and the second signal are changed and complementary, the mobile communication device is switched from the power-saving mode to a normal working mode.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
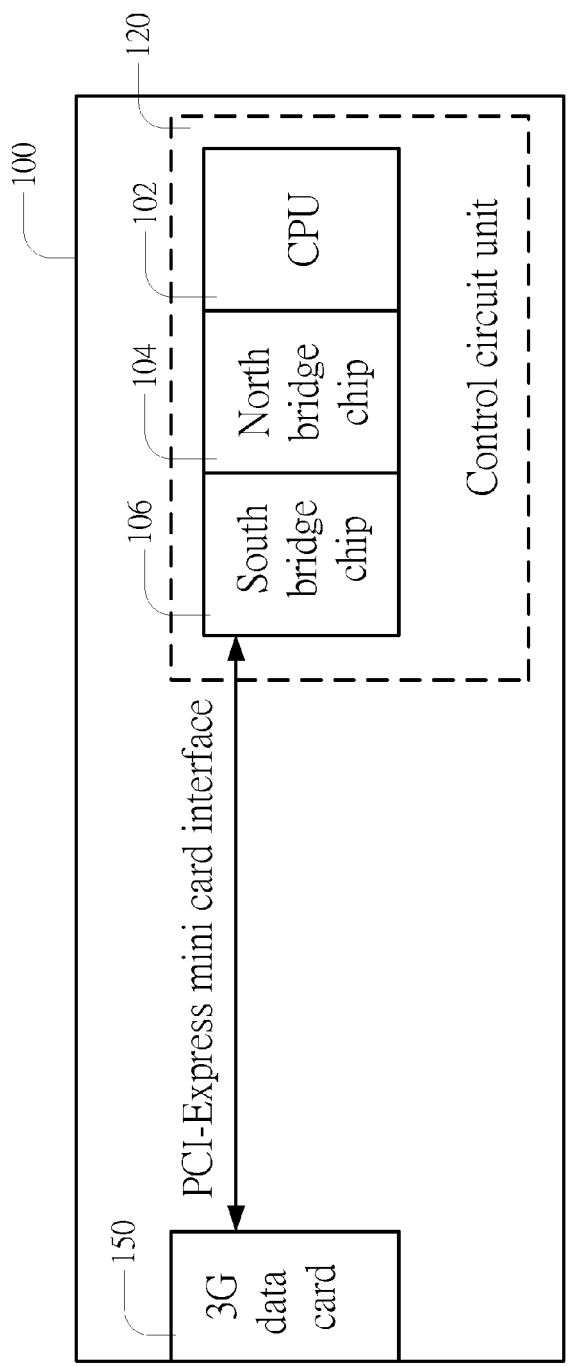
FIG. 1 is a schematic functional block diagram illustrating a notebook computer that is connected to a 3G data card according to the prior art.
Figure 2:
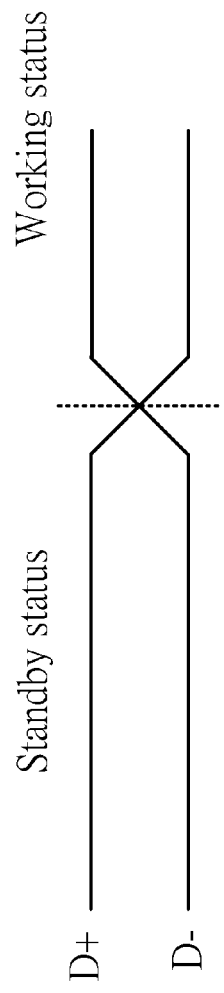
FIG. 2 is a timing waveform diagram schematically illustrating the USB signals corresponding to the standby status and the working status of a 3G data card.

Generally, the 3G data card transmits a USB signal through the USB interface of the PCI-Express mini card interface. According to the USB signal, the 3G data card is operated in a first state (a standby status) or a second state (a working status). FIG. 2 is a timing waveform diagram schematically illustrating the USB signals corresponding to the standby status and the working status of a 3G data card. In a case that the USB D+ signal is maintained at the high-level state and the USB D− signal is maintained at the low-level state, the 3G data card is operated at the standby status. For resuming operations of the 3G data card, the USB D+ signal is switched from the high-level state to the low-level state and the USB D− signal is switched from the low-level state to the high-level state.

In the working status, the 3G data card could normally transmit data. In other words, when the operating status of the 3G data card is switched from the standby status to the working status, a status-changing signal is generated by the 3G data card.

The present invention provides a mobile communication device and a method for controlling the mobile communication device. By using the controlling method of the present invention, the mobile communication device can be switched from the power-saving mode to the normal working mode to receive an external phone call through the data card even if the mobile communication device is in the power-saving mode.

Figure 3:
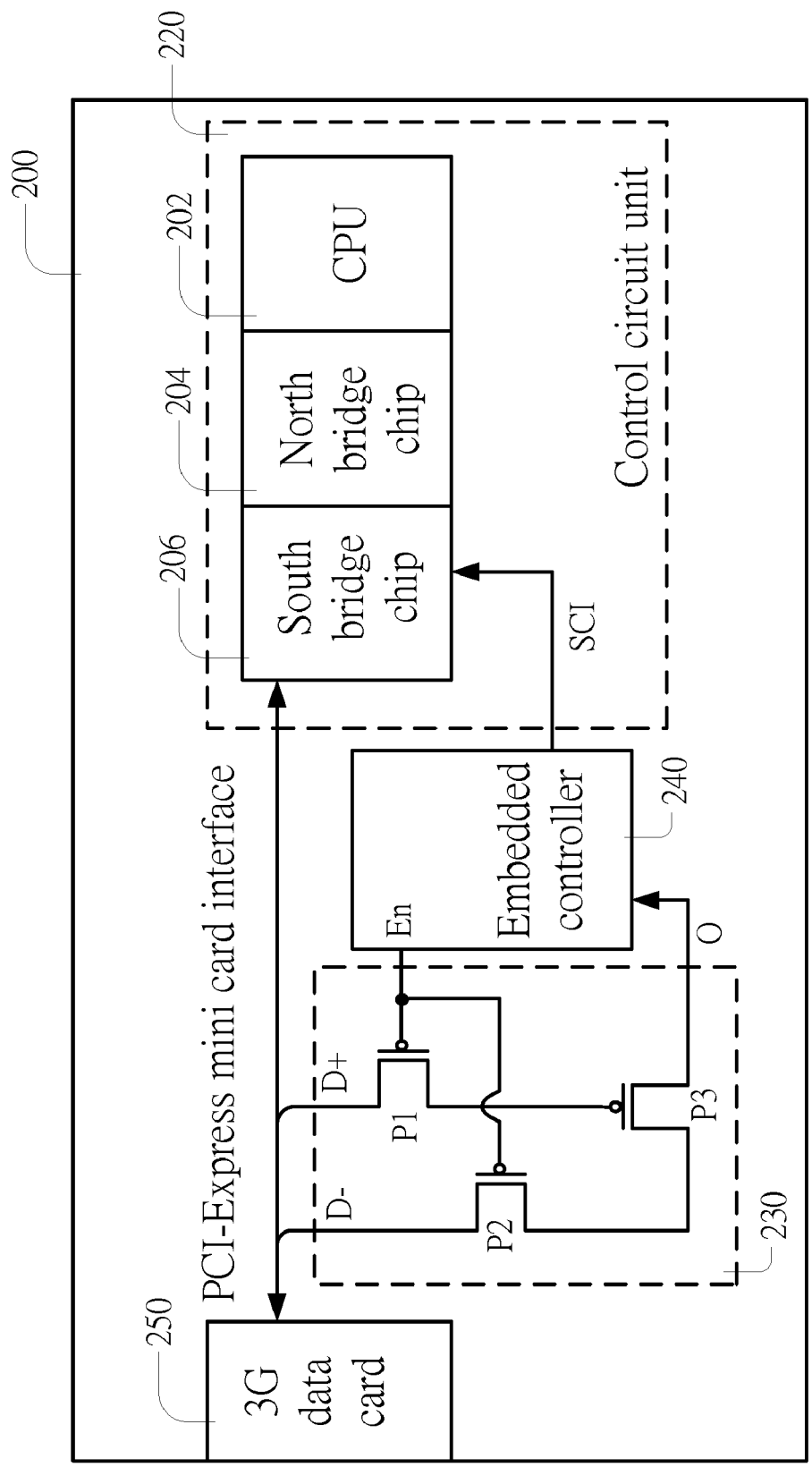
FIG. 3 is a schematic functional block diagram illustrating a notebook computer that is connected to a 3G data card according to an embodiment of the present invention.

FIG. 3 is a schematic functional block diagram illustrating a notebook computer that is connected to a 3G data card according to an embodiment of the present invention. As shown in FIG. 3, the notebook computer 200 comprises a control circuit unit 220. The control circuit unit 220 comprises a central processing unit (CPU) 202, a north bridge chip 204 and a south bridge chip 206. The notebook computer 200 further comprises a peripheral component interconnect mini card (or PCI-Express mini card) interface. Via a USB interface of the PCI-Express mini card interface, the 3G data card 250 and the control circuit unit 220 communicate with each other to exchange data in order to implement the functions of wireless network connection and wireless communication. Moreover, the notebook computer 200 further comprises a status change detecting circuit 230 and an embedded controller 240. The status change detecting circuit 230 is connected to the PCI-Express mini card interface for receiving the USB D+ signal and the USB D− signal. The embedded controller 240 is interconnected between the status change detecting circuit 230 and the control circuit unit 220.

Hereinafter, a method for controlling the notebook computer according to an embodiment of the present invention will be illustrated in more details with reference to FIG. 3. In a case that the 3G data card 250 is in the standby status and the notebook computer 200 enters a power-saving mode, the embedded controller 240 issues an enabling signal to the status change detecting circuit 230. In response to the enabling signal, the status change detecting circuit 230 is enabled. Once the status change detecting circuit 230 is enabled, the status change detecting circuit 230 will detect the status change of the USB signal. In a case that an external phone call is received by the 3G data card 250, the 3G data card 250 will be switched from the standby status to the working status. Once the status change of the USB signal is detected by the status change detecting circuit 230, the status change detecting circuit 230 will notify the embedded controller 240 to issue a system control interrupt (SCI) signal to the south bridge chip 206 of the control circuit unit 220. In response to the SCI signal, the notebook computer 200 resumes to the normal working mode S0. Meanwhile, the 3G data card 250 and the control circuit unit 220 communicate with each other to exchange data.

After the notebook computer 200 enters the normal working mode S0, the enabling signal is no longer transmitted to the status change detecting circuit 230 and thus the embedded controller 240 is disabled.

In an embodiment, the status change detecting circuit 230 and the embedded controller 240 are electrically connected to a standby power source. Consequently, the status change detecting circuit 230 and the embedded controller 240 can normally operate even if the notebook computer 200 is in the power-saving mode.

Please refer to FIG. 3 again. The status change detecting circuit 230 comprises a first PMOS transistor P1, a second PMOS transistor P2 and a third PMOS transistor P3. The first PMOS transistor P1 has a first terminal for receiving the USB D+ signal. The first PMOS transistor P1 has a gate terminal connected to an enabling signal output terminal En of the embedded controller 240. The second PMOS transistor P2 has a first terminal for receiving the USB D− signal. The second PMOS transistor P2 has a gate terminal connected to the enabling signal output terminal En of the embedded controller 240. The third PMOS transistor P3 has a first terminal connected to a second terminal of the second PMOS transistor P2. The third PMOS transistor P3 has a gate terminal connected to a second terminal of the first PMOS transistor P1. The second terminal of the third PMOS transistor P3 is connected to the embedded controller 240 and served as an output terminal O of the status change detecting circuit 230.

In a case that the 3G data card 250 is in the standby status and the notebook computer 200 enters a power-saving mode, the enabling signal issued by the embedded controller 240 is at a low-level state. In response to the enabling signal, the first PMOS transistor P1 and the second PMOS transistor P2 are conducted. Meanwhile, since the high-level USB D+ signal is received by the gate terminal of the third PMOS transistor P3, the third PMOS transistor P3 is shut off. In other words, the low-level state at the output terminal O of the status change detecting circuit 230 indicates that no status-changing signal has been detected by the status change detecting circuit 230.

On the other hand, in a case that an external phone call is received by the 3G data card 250, the 3G data card 250 switches from the standby status to the working status. At this moment, the low-level USB D+ signal is received by the gate terminal of the third PMOS transistor P3, and thus the PMOS transistor P3 is conducted. In addition, the high-level USB D− signal will be transmitted from the first terminal of the third PMOS transistor P3 to the output terminal O of the status change detecting circuit 230. According to the high-level state at the output terminal O of the status change detecting circuit 230, the embedded controller 240 realizes that the status of the USB signal has been changed. As such, the embedded controller 240 will issue the SCI signal to the control circuit unit 220. In response to the SCI signal, the notebook computer 200 enters the normal working mode S0. Meanwhile, the 3G data card 250 and the control circuit unit 220 communicate with each other to exchange data.

After the notebook computer 200 enters the normal working mode S0, the enabling signal issued by the embedded controller 240 is at a high-level state. Under this circumstance, the first PMOS transistor P1 and the second PMOS transistor P2 are shut off. In other words, the status change detecting circuit 230 is disabled.

The above embodiments are illustrated by referring to a PCI-Express mini card interface for connecting the notebook computer and the 3G data card. Nevertheless, other interfaces are also applicable for connecting the notebook computer and the data card. For example, an external data card could be plugged into a USB port of the notebook computer. If the external data card switches from the standby status to the working status, the USB D+ signal and the USB D− signal are detected by the status change detecting circuit in order to control the operating mode of the notebook computer to be switched from the power-saving mode to the normal working mode.

From the above description, the mobile communication device and the controlling method of the present invention are capable of receiving an external phone call through the data card even if the mobile communication device is in the power-saving mode.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mobile communication device connected with a data card, the mobile communication device comprising:
   a control circuit unit operated in either a normal working mode or a power-saving mode;
   an embedded controller connected with the control circuit unit,
   a first interface connected with the data card and the control circuit unit; and
   a status change detecting circuit connected with the first interface and the embedded controller, wherein the status change detecting circuit comprises:
      a first transistor having a gate terminal for receiving an enabling signal outputted from the embedded controller, and a first terminal for receiving the first signal;
      a second transistor having a gate terminal for receiving the enabling signal outputted from the embedded controller, and a first terminal for receiving the second signal; and
      a third transistor having a gate terminal connected to a second terminal of the first transistor, a first terminal connected to a second terminal of the second transistor, and a second terminal connected to the embedded controller;
   wherein if the control circuit unit is operated in the power-saving mode and the data card is switched from a standby status to a working status, the data card generates a status-changing signal to the status change detecting circuit, and in response to the status-changing signal, the control circuit unit is controlled to be switched from the power-saving mode to the normal working mode by the embedded controller.

2. The mobile communication device according to claim 1 wherein the control circuit unit is switched from the power-saving mode to the normal working mode in response to a system control interrupt signal issued by the embedded controller.

3. The mobile communication device according to claim 1 wherein the first signal is at a high-level state and the second signal is at a low-level state when the data card is in the standby status, and the first signal is at a low-level state and the second signal is at a high-level state when the data card is in the working status.

4. The mobile communication device according to claim 1 wherein the status change detecting circuit is enabled by the embedded controller when the control circuit unit is operated in the power-saving mode, and the status change detecting circuit is disabled by the embedded controller when the control circuit unit is operated in the normal working mode.

5. The mobile communication device according to claim 1 wherein the first interface is a peripheral component interconnect mini card interface, and the data card is a built-in 3G data card of the mobile communication device.

6. The mobile communication device according to claim 1 wherein the first interface is a USB interface, and the data card is a 3G data card externally connected to the USB interface.

7. The mobile communication device according to claim 1 wherein the mobile communication device is a notebook computer, a personal digital assistant, or a media information device.

8. A method for controlling a mobile communication device, the mobile communication device being connected with a data card through a first interface, the method comprising steps of:
   detecting a first signal and a second signal provided by the first interface if the mobile communication device is operated in a power-saving mode;
   maintaining the mobile communication device in the power-saving mode if the first signal and the second signal are unchanged and complementary; and
   switching the mobile communication device from the power-saving mode to a normal working mode if the first signal and the second signal are changed and complementary;
   wherein the mobile communication device further comprises a status change detecting circuit for receiving the first signal and the second signal,
   wherein the mobile communication device further comprises an embedded controller connected with the status change detecting circuit,
   wherein the status change detecting circuit comprises:
      a first transistor having a gate terminal for receiving an enabling signal outputted from the embedded controller, and a first terminal for receiving the first signal;
      a second transistor having a gate terminal for receiving the enabling signal outputted from the embedded controller, and a first terminal for receiving the second signal; and
      a third transistor having a gate terminal connected to a second terminal of the first transistor, a first terminal connected to a second terminal of the second transistor, and a second terminal connected to the embedded controller.

9. The method according to claim 8 wherein the first interface is a peripheral component interconnect mini card interface, the first signal is a USB D+ signal, and the second signal is a USB D− signal.

10. The method according to claim 8 wherein the first signal is at a high-level state and the second signal is at a low-level state when the data card is in a standby status, and the first signal is at a low-level state and the second signal is at a high-level state when the data card is in a working status.

11. The method according to claim 8 wherein the mobile communication device is switched from the power-saving mode to the normal working mode in response to a system control interrupt signal issued by the embedded controller.

12. The method according to claim 8 wherein the mobile communication device is a notebook computer, a personal digital assistant, or a media information device.

13. The method according to claim 8 wherein the first interface is a peripheral component interconnect mini card interface, and the data card is a built-in 3G data card of the mobile communication device.

14. The method according to claim 8 wherein the first interface is a USB interface, and the data card is a 3G data card externally connected to the USB interface.

* * * * *